United States Patent [19]

Henriot

[11] Patent Number: 4,574,036
[45] Date of Patent: Mar. 4, 1986

[54] METHOD AND AN INSTALLATION FOR PURIFYING INDUSTRIAL WASTE WATER, PARTICULARLY PROCESS WATER FROM DYEING WORKS

[75] Inventor: Pierre A. Henriot, St. Dié, France

[73] Assignee: Ets. Ch. Scareder & Fils, Saint-Dié, France

[21] Appl. No.: 458,353

[22] Filed: Jan. 17, 1983

[51] Int. Cl.$^4$ .......................... B01D 1/26; C02F 1/04
[52] U.S. Cl. ........................................ 203/39; 203/10; 203/40; 159/22; 159/17.1; 159/46; 159/47.3; 202/174; 202/177; 202/197; 202/200; 202/202; 210/917
[58] Field of Search ...................... 203/10, 40, 39, 11; 202/200, 202, 174, 197, 177, 235; 159/46, 17 R, 17 C, 4 K, 22, 23, 47.3; 210/702, 705, 917, 198.1, 737

[56] References Cited

U.S. PATENT DOCUMENTS

| 3,469,616 | 9/1969 | Laguilharre | 159/46 |
| 3,692,634 | 9/1972 | Othmer | 159/16 A |
| 3,716,458 | 2/1973 | Greenfield et al. | 159/17 C |
| 3,774,840 | 11/1973 | Boatright | 210/198.1 |
| 4,010,098 | 3/1977 | Fassell | 210/702 |
| 4,017,421 | 4/1977 | Othmer | 159/47.3 |
| 4,279,693 | 7/1981 | Kühnlein et al. | 159/47.3 |
| 4,441,437 | 4/1984 | Moskan | 159/47.3 |

FOREIGN PATENT DOCUMENTS

| 2222321 | 10/1974 | France . | |
| 2260549 | 9/1975 | France . | |
| 2267285 | 11/1975 | France . | |
| 2365359 | 4/1978 | France . | |
| 0118855 | 10/1978 | Japan | 210/917 |
| 0118654 | 9/1979 | Japan | 210/917 |
| 0167099 | 12/1980 | Japan | 210/702 |
| 1401384 | 7/1975 | United Kingdom | 203/39 |
| 2056962 | 3/1981 | United Kingdom | 210/917 |

OTHER PUBLICATIONS

Judkins et al, *Color Removal from Textile Dye Waste Using Magnesium Carbonate*, Ala., Nov. 1978.
Journal WPCF, Nov. 1978, pp. 2446–2456.

*Primary Examiner*—S. Leon Bashore
*Assistant Examiner*—V. Manoharan
*Attorney, Agent, or Firm*—St. Onge Steward Johnston & Reens

[57] ABSTRACT

Polluted industrial waste water having a high chemical demand for oxygen and fine particles in suspension is purified using the following steps: directly heating and evaporating the polluted water without subjecting it to the usual prior steps of mechanical separation such as sieving or decanting; separating sludges from the evaporated water; condensing the evaporated water; subjecting the condensed evaporated water to a physicochemical purifying process of the coagulation-flocculation type; and filtering the purified condensed evaporated water. The purified water is pure enough to be recycled through a dyeing works. The installation includes an evaporator (10) which is preferably built in several stages with the vapor from each stage other than the first being used to evaporate the polluted water in the next stage.

7 Claims, 2 Drawing Figures

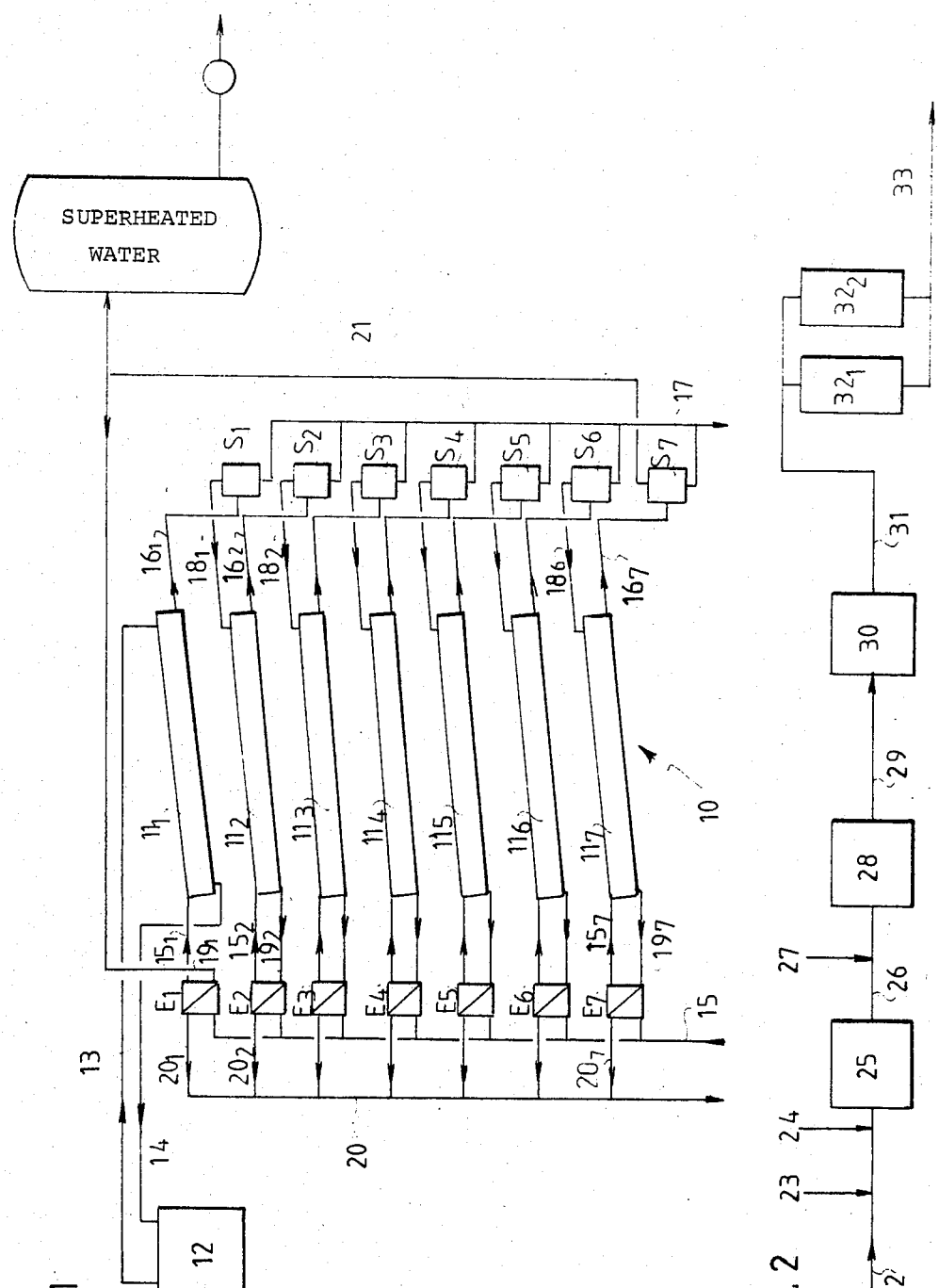

METHOD AND AN INSTALLATION FOR PURIFYING INDUSTRIAL WASTE WATER, PARTICULARLY PROCESS WATER FROM DYEING WORKS

The present invention relates to a method and to an installation for purifying industrial waste water, and it is particularly applicable to process water from dyeing works.

BACKGROUND OF THE INVENTION

At present, the methods used for purifying industrial process water call for an initial step in which the waste is homogenised and in which coarse purification is performed by mechanical separation (sieving, decanting, etc.). This is followed by a second step in which pollution is reduced by simple methods which may be biological or physico-chemical (eg. coagulation, flocculation and filtration), and there may be an optional third or finishing step in which residual dissolved matter is eliminated by means of fine separation techniques such as: separation by means of semi-permeable membranes, adsorption on the surface of a solid of high specific surface area, ion exchange on a resin, or separation by means of grafted cellulose.

For waters having a high chemical demand for oxygen (CDO) and having fine particles in suspension, eg. the waters from a dyeing works where the particles in suspension are about 1 to 2 tenths of a millimeter in diameter, coagulation-flocculation processing is very important. But regardless of the conditions under which this chemico-physical process takes place, in particular regardless of the degree of separation attained by a prior decanting step, the CDO after coagulation-flocculation processing is not reduced by more than 40 to 50%.

The chemical demand for oxygen of water treated in this way is generally much too high for the water to be recycled in the factory's industrial process from whose treated wastes the water originates. This leads to high water supply costs together with relatively high tax payments for rejecting treated water into protected water courses.

Further, and particularly for water from dyeing works, conventional processing does not remove the color from the waste water, which makes the waste water quite unusable in industrial processes.

Another problem inherent to usual purification techniques lies in getting rid of the resulting sludge at the end of the process. Waters having a high chemical demand for oxygen and which therefore require large quantities of coagulating agent and of flocculating agent give rise to considerable volumes of sludge.

Preferred embodiments of the invention provide a method of purifying waste water which method reduces the pollution in the water sufficiently for the water to be recycled in the industrial process. More particularly, the invention can be used to remove the color from waste water from dyeing works.

Furthermore, the invention can be used to obtain the polluting matter from the water in a highly concentrated form.

Finally the invention can be used to provide a method and an installation for purifying waste water that are simple and cheap.

SUMMARY OF THE INVENTION

The present invention provides, in a first aspect, a method of purifying polluted industrial waste water having a high chemical demand for oxygen and fine particles in suspension, the method comprising the steps of:

directly heating and evaporating the polluted water without subjecting it to the usual prior steps of mechanical separation such as sieving or decanting;

separating sludges from the evaporated water;

condensing the evaporated water;

subjecting the condensed evaporated water to a physico-chemical purifying process of the coagulation-flocculation type; and filtering the purified condensed evaporated water.

One of the essential characteristics of the invention is the step of heating the polluted water and evaporating it. Generally speaking, evaporation processes are only acceptable on an industrial scale if all the resulting end products are useful. In particular, in order for the process to be economic, the distilled water produced must be capable of being recycled, the vapor must be used, and the sludges must be easy to dispose of. The method according to the invention can satisfy all these requirements.

The Applicant has observed that in purifying processes used up to now coagulation-flocculation operations only give 40% to 50% efficiency in terms of reducing the chemical demand for oxygen, whereas prior evaporation leads in a surprising manner to a considerable improvement in the efficiency of such physico-chemical processes, with their efficiency being raised to the region of 80% to 95%.

Evaporation thus has a manifest synergetic effect on subsequently performed physico-chemical operations. This effect can be seen both in the purity of the water obtained at the end of the process, since said water is sufficiently depolluted to be directly recycled through the industrial process, and, particularly in the dyeing industry, it can be seen in the quality of the recycled water which has a lower concentration of furring substances (calcium, silica, etc.) than does drinking water, thereby providing improved dyeing when recycled water is used. This synergistic effect between the evaporation step and the coagulation-flocculation step can also be seen in improved heat exchange during the evaporation step by virtue of the very low levels of silica and calcium in the recycled flocculated water.

The vapor produced by heating and evaporating the polluted water is used, after the sludges have been separated therefrom, to pre-heat the polluted water admitted to the evaporator. This has a beneficial effect on the cost of the evaporation step by minimizing the energy input necessary for heating the water.

Finally, the volume of sludge extracted at the end of the process is very small. Since the evaporation step reduces the chemical demand for oxygen (CDO) by about 75% to 90%, the subsequent coagulation-flocculation processing acts on water which is already considerably depolluted, and therefore produces little sludge.

Another aspect of the present invention provides an installation for performing the above-defined method, the installation comprising an evaporator which is directly connected to an outlet pipe conveying waste water, a separator connected to receive vapor from the evaporator to separate sludges therefrom, coagulation-flocculation means directly connected to receive water from a non-sludge outlet from the separator, and filter means. Decanting means may optionally be provided just before the filter means.

This installation is very simple. Devices for prior sieving, decanting, etc., are not required. Such devices are commonly used in water treatment plants, and they always occupy large areas. The invention also avoids the use of separation devices for separating the fine residual matter contained in the water. Such devices are generally required in present practice.

BRIEF DESCRIPTION OF THE DRAWING

An embodiment of the invention is described by way of example with reference to the accompanying drawing, in which:

FIG. 1 is a schematic diagram of an evaporator installation for performing the first step of the invention; and FIG. 2 is a block diagram showing the sequence of operations that are subsequently performed on the water after evaporation.

MORE DETAILED DESCRIPTION

In accordance with the invention, water to be purified is subjected directly to evaporation by heating before being subjected to a physico-chemical process of the coagulation-flocculation type.

An evaporation installation 10 is shown in FIG. 1. It comprises a plurality of stages, there being seven in the example shown. A first, or upper, evaporator stage $11_1$ is supplied with heating fluid from a boiler 12. The heating fluid is delivered via a pipe 13 and returned to the boiler via a pipe 14. Polluted water taken from a main pipe 15 is fed to the evaporator stage $11_1$ via a pipe $15_1$ and an economizer $E_1$ in which the water is pre-heated. The dirty vapor produced in the evaporator leaves via a pipe $16_1$ leading to a separator $S_1$, eg. a centrifugal separator. There are two outputs from the separator: a clean vapor output; and a sludge output leading to a pipe 17.

The clean vapor is used as the heating fluid for a second evaporator stage $11_2$. The clean vapor arrives via a pipe $18_1$, and the water which condenses therefrom leaves the evaporator via a pipe $19_2$ and then passes through an economizer $E_2$ in which it is used to preheat polluted water brought to the economizer by the pipe 15. The preheated polluted water leaves the economizer via a pipe $15_2$ and is inserted into the evaporator stage $11_2$ where it is evaporated by exchanging heat with the clean vapor, and it leaves the evaporator via a pipe $16_2$ leaving to a second separator $S_2$. In turn, the second separator $S_2$ adds further sludge to the pipe 17 and clean vapor arrives via a pipe $18_2$ to a third evaporator stage $11_3$.

Polluted water, clean vapor from the heating, and water condensed from vapor follow analogous paths through stages 3 to 7. Vapor leaves the last stage evaporator $11_7$ via a pipe $16_7$ which conveys it to a separator $S_7$ and the resulting clean vapor is then taken by a pipe 21 to condense in the economizer $E_1$ of the first stage, thereby pre-heating the polluted water admitted thereto.

It can thus be seen that the evaporator installation's energy input requirements are limited to the energy required to heat the heating fluid to the first evaporator stage, each subsequent stage using clean vapor from the immediately preceding stage as heating fluid.

The evaporated and condensed water leaves each evaporator stage via a pipe $20_1 \ldots 20_7$ to be collected in a pipe 20 which leads to a pipe 22 (FIG. 2) for conveying water being purified to a physico-chemical processing installation.

At suitable points along the pipe 22 there is firstly a device 23 for measuring the pH of the water and for adjusting the pH to a value at which the subsequent coagulation operation can be performed satisfactorily, and secondly there is a device 24 for adding measured quantities of the coagulating agent(s) used. The water then enters a coagulator 25. The coagulating agent destabilises the emulsions of polluting material which is transferred by the vapor and which is in the form of very finely dispersed particles. Since such techniques are known they are not described here in detail.

The coagulator 25 has an output pipe 26 to which a device 27 is connected for adding measured quantities of flocculating agent(s) to the water after it has been coagulated. The water is then admitted to a flocculator 28 in which the flocculating agent causes the polluting matter to precipitate.

The flocculated water leaves the flocculator 28 via a pipe 29 leading to a decanting tank 30. The decanting tank is optional, and the flocculated water, whether decanted or not, then passes via a pipe 31 to a filter 32 constituted by first and second sand filter units $32_1$ and $32_2$. The filtered water is then recovered in a pipe 33 whence it is either recycled through the industrial process that gave rise to the pollution or else it is rejected into a protected water course.

Depending on the pH of the condensed evaporated water, and on the desired pH, the pH is adjusted either by adding soda, potash, or the like, or else by adding formic acid, acetic acid, or the like.

Depending on the polluting substances remaining in the condensed evaporated water, conventional coagulating agents are used such as: alumina sulphate, ferric chloride, lime, calcium chloride, ferrous sulphate, magnesium chloride, and the like.

Likewise depending on the nature of the polluting substances remaining in the condensed evaporated water, various kinds of flocculating agent may be used, for example: inorganic flocculating agents such as activated silica, bentonite, or polymer structure metallic hydroxides; natural flocculating agents such as hydrosoluble polymers which are anionically charged, cationically charged or neutral, starchy derivatives (maize starch, potato flakes, etc.), polysaccharides, alginates, etc.; or even synthetic flocculating agents such as polyacrylamides copolymered with acrylic acid (anionic), amine compounds (cationic), polyethylene-imines, amine polyamides, polyamides, ethylene polyoxides, sulphonated compounds, and the like.

There follows a non-limiting example of the method according to the invention as applied to water from a dyeing works.

The average composition of the polluted water is as follows:
  chemical demand for oxygen (CDO) to 3000 mg/liter;
  biological demand for oxygen ($BDO_5$) 450 to 600 mg/liter;
the $CDO/BDO_5$ ratio is too high in this case for the polluting matter to be biologically degraded;
  dry extract=0.4%, with 50% organic matter and 50% inorganic matter.

The inorganic matter is made up as follows:

| | |
|---|---|
| silica SiO$_2$ | 18% |
| calcium CaO | 11% |
| copper Cu | 3% |
| iron Fe$_2$O$_3$ | 6% |
| sulphite SO$_3$ | 9% |
| phosphate P$_2$O$_5$ | 3% |

The organic matter comprises surface-active substances of various polarities and substances derived from the raw materials and from the dye-stuffs.

The surface-active substances include anionic substances (sulphonates of synthetic products), non-ionic substances (alcohols and ethoxylised fatty amines), and cationic substances (quaternised fatty amines).

The substances derived from the raw materials include textile oils, synthetic fibre oligomers, waxes and pectic substances from cotton.

The dye-stuffs include soluble and non-soluble azo dyes, polyazo dyes, and anthraquinonic dyes.

This polluted water is processed using the method according to the invention.

The polluted water is initially evaporated in an installation of the type described above with reference to FIG. 1.

The evaporator installation operates under the following conditions:

(residual vapor/polluted water) ratio = 10%
number of stages = 7
temperature of polluted water = 50° C.
temperature of distilled water = 65° C.
residual saturated vapor pressure = 7 bars effective
residual saturated vapor temperature = 170° C.
inlet and outlet temperatures of the first stage heating fluid = 260° C. and 240° C.
vapor temperature at the outlet from the first stage = 225° C.
vapor temperature at the outlet from each of the following stages = about 7° to 8° C. less than the preceding stage.

The condensed evaporated water obtained at the outlet from the installation is then coagulated, flocculated, and filtered.

The coagulating agent used in the appropriate manner for this water is bicarbonate of soda and/or alumina sulphate.

Polyamine type compounds are used as the flocculating agent.

The average characteristics of water treated in this way are as follows:

Characteristics of the water after evaporation:
CDO = 600 mg/liter
dry extract = 0.040%
% composition same as in the polluted water turbidity = UJ 65

Average characteristics of the flocculated water:
CDO = 40 mg/liter
dry extract not measured
turbidity = UJ 1 to 2 (better than drinking water)
hardness = 2° f
TAC alcalinity = 12° f
chloride = 53.6 mg/liter
silica = 2 mg/liter.

Thus the CDO is reduced overall by 98%. The water may be recycled directly through the industrial dyeing process. Further, the water has a lower level of furring substances than ordinary drinking water, which improves the quality of dyeing during the following industrial dyeing cycle.

The coagulating and flocculating process as applied to the condensed evaporated water reduces the CDO by 93%, which is a considerable improvement over the usual efficiencies obtained with such processes, which generally are no better than 40% to 50%.

I claim:

1. A method of purifying polluted industrial waste water having a high chemical demand for oxygen and fine particles in suspension, the method comprising the steps of:
   directly heating and evaporating the polluted water to produce a mixture of water vapor and sludge without first subjecting it to mechanical separation by sieving or decanting;
   separating sludge from the water vapor; condensing the water vapor;
   subjecting the condensed water vapor to a coagulation-flocculation chemical purifying process; and
   filtering the purified condensed water vapor.

2. A method according to claim 1, wherein the vapor from which sludge has been separated is used to preheat the polluted water.

3. A method according to claim 1, wherein the purified water is recycled through the industrial process that gives rise to the polluted water.

4. A method according to claim 1, wherein the waste water is from dyeing works.

5. An apparatus for purifying polluted industrial waste water having a high chemical demand for oxygen and fine particles in suspension, wherein the apparatus comprises:
   an outlet pipe for conveying waste water from an industrial process,
   an evaporator directly connected to the outlet pipe conveying waste water,
   a separator connected to receive a mixture of vapor and sludge from the evaporator to separate sludge therefrom,
   a coagulation-flocculation means for treating the water vapor in a condensed state, and a filter means for receiving treated water from the coaggulation-flocculation means.

6. An apparatus according to claim 5, wherein the evaporator includes at least two stages, with the vapor outlet from the last stage being connected via a separator to preheat the polluted water before its admission to the first stage.

7. An apparatus according to claim 5, wherein the evaporator includes at least two stages, with the vapor outlet from each stage other than the last being connected via a respective separator to a heating fluid inlet of the next stage of the evaporator, with the heating fluid outlet of each said next stage being connected to preheat polluted water before its admission thereto.

* * * * *